Feb. 8, 1949.  E. R. KANHOFER  2,460,987
MIXING AND SEPARATING APPARATUS
Filed Feb. 23, 1945

Inventor:
Elmer R. Kanhofer
By: Lee J. Gary
Attorney.

Patented Feb. 8, 1949

2,460,987

UNITED STATES PATENT OFFICE 2,460,987

MIXING AND SEPARATING APPARATUS

Elmer R. Kanhofer, Riverside, Ill., assignor to Universal Oil Products Company, Chicago, Ill., a corporation of Delaware Application February 23, 1945, Serial No. 579,441

6 Claims. (Cl. 23—285)

This invention relates to a mixing and separating apparatus wherein fluids are mixed and contacted in one zone and then centrifuged in a second separating zone to effect a relatively complete separation of the fluids into light and heavy phases. The apparatus is especially useful in the contacting of substantially immiscible liquids and in maintaining the liquid of highest specific gravity within the apparatus. The operation of the apparatus is such that the liquids being handled may pass continuously through the contacting and separating zones of the apparatus.

One object of the invention is to provide an apparatus combining the mechanical mixing and separating operations within a single chamber. Another object is to provide an apparatus in which the mixing rotor and the centrifuge paddles are driven by a single drive shaft.

Still another object is to provide an apparatus which may be substituted for the usual mixing and separating chambers and the accompanying pipe lines, pumps, etc., these being necessary when the separating chamber is remote from the mixing zone.

Still another object is to provide an apparatus which can return the heavy centrifuged liquid phase from the separating zone directly to the mixing zone, so that it can again be used as a contacting liquid in the mixing zone.

This improved apparatus is of particular value in connection with chemical processes employing liquid catalysts or treating agents. For example, in the alkylation of hydrocarbons, isoparaffins are reacted with olefins in the presence of a mineral acid catalyst such as sulfuric acid, hydrofluoric acid or phosphoric acid. The reactants and catalysts are introduced, in liquid state and at a temperature suitable for conducting their reactions, into a reaction zone where good contact is obtained and wherefrom the products are passed to suitable separating and recovery apparatus.

The use of mixing blades or rotors generally provide the greatest efficiency for agitating and contacting liquid materials and for obtaining an emulsion-like mixture which is very desirable in an alkylation process. Also, use of mechanical centrifuging is more rapid and efficient than is gravity separation, so that in connection with the alkylation of hydrocarbons, the emulsion of hydrocarbons and acid from the mixing zone may advantageously pass to an adjacent centrifuging zone. In the centrifuging zone of the apparatus of this invention, the heavier acid is thrown to the outer wall of the chamber and returned to the mixing or contacting zone for reuse, while the alkylated hydrocarbons can be withdrawn from the upper part of the chamber substantially free of acid catalyst.

The combination apparatus may well be used for various chemical or treating processes other than the alkylation of hydrocarbons. The features of the apparatus are such that from the mechanical aspect, or from efficiency considerations, the size of the apparatus should not be made too large; however, for relatively large processing plants a plurality of the units may well be used, while for a relatively small process plant, a single combined apparatus may be used.

There are many types of mixers using rotating plates, or propellers, or rotors and straightening vanes, also there are various types of centrifuging apparatus, making use of rotating disks, rotating bowls or revolving plates. However, the mixing and separating operations are not ordinarily carried out within the same housing or chamber and in the usual centrifuging operation the light and heavy components are separated from one another and separately discharged from the device. In this invention, baffles and spiral vanes are provided to flow the heavier centrifuged liquid phase along the inside of the chamber wall and return it directly to the lower part of the mixing section, so that it may again be used as a contacting material.

In the preferred embodiment of this combined contacting and separating apparatus, the mixing and centrifuging sections are housed within a single cylindrical and vertical positioned chamber. The mixing section is in the lower part of the chamber and is separated from the upper centrifuging section by a horizontal baffle plate which has a central opening for upward flow of liquid therethrough and for a drive shaft. A single axial positioned drive shaft extends through the adjacent mixer and separating zones. An electrical motor or any other desired type of prime mover may be used to turn the shaft and revolve a turbine-type rotor mounted thereon in the mixing zone and paddle type blades mounted thereon in the centrifuging zone. A plurality of straightening vanes are placed just clear of the outer periphery of the turbine type of rotor in the mixing zone. An inner shell or baffle circumscribes the mixing zone and connects to the horizontal baffle plate which separates the upper and lower sections and is spaced a short distance from the outer chamber wall in order to provide an annular space for flow of the heavy centrifuged liquid from the upper separating zone to the lower part of the mixing zone. Inlet means are provided to introduce liquids into the mixing zone at the lower end of the chamber and outlet means to discharge the lighter centrifuged liquid of the reaction product from the upper section of the chamber.

Various modifications may be made to the apparatus of this invention, spiral vanes may be placed on the inside of the chamber wall in the upper zone to direct flow of the heavy centrifuged liquid along the outer wall to the annular passage space provided and to the lower part of the vessel in the mixing zone. Also these straightening vanes may be made hollow to have a cooling or heating medium flow therethrough and act as a cooling or heating coil in the reaction zone. In some processes the reaction temperature is very critical, such that the additional temperature control thus provided by the vanes may be very important. The dual use of the straightening vanes also eliminates need of additional cooling pipes or coils in the chamber.

The accompanying diagrammatic drawings illustrate one form of a combined mixing and separating apparatus embodying the principal features of the invention.

Figure 1:
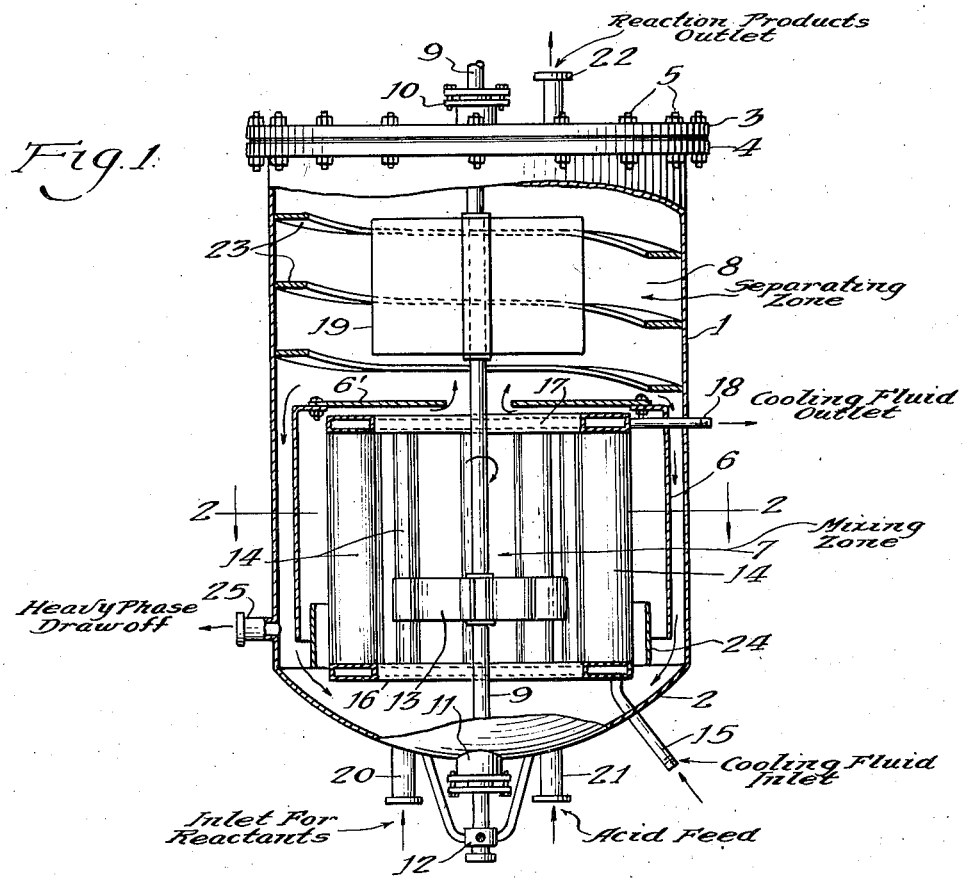
Figure 1 is a sectional elevation view of the improved apparatus.

Referring to Figure 1, the numeral 1 refers to the outer cylindrical housing or shell of the apparatus, the lower head 2, in the case illustrated, is integral with the shell, while the upper head 3 is in the form of a cover plate detachably secured to the upper flange 4 of the shell 1 by bolts 5. An inner cylindrical shell or baffle 6 and the horizontal disc-like baffle 6' serve to separate the lower mixing zone 7 from the upper separating zone 8. The horizontal baffle 6' should be detachably fastened to the inner shell 6 as indicated for assembly and construction purposes. A rotatable shaft 9 extends through the apparatus and the packing glands 10 and 11 on the respective upper and lower heads of the housing. The lower end of the shaft 9 is shown terminating in an outboard thrust bearing 12, while the upper end of the shaft may be connected by a flexible coupling or gearing, or any other desired means (not shown), to any desired type of motivating means, such as an electric motor.

A turbine type of rotor 13 is attached to the shaft 9 in the lower part of the mixing zone 7, the blades to this rotor may be curved as shown, or they may be substantially straight. The function of this lower rotor 13 is to give the entering liquid a swirling, turbulent motion and obtain intimate mixing and contact between all the liquids. Stationary curved vanes 14 are placed around the interior of the mixing zone, to act as straightening vanes for fluid flow in the mixing operation. These straightening vanes 14 are shown to be of hollow construction, such that they may also serve as cooling fins. A cooling fluid inlet connection 15 and a distributing header 16 are shown below the vanes 14 while an outlet header 17 and an outlet conduit connection 18 are shown at the top of the plurality of vanes 14. This cooling modification is optional, since it may be unnecessary in some processes, but of value in others.

Paddle type blades 19 are attached to the shaft in the separating section 8 to provide a centrifuging swirl to the liquids entering this zone. The fluids enter this zone through the enlarged opening around the shaft in the horizontal baffle 6'. The inlet nozzles 20 and 21, in the lower head 2, are used to admit the reactants and treating materials into the mixing zone 7, while the outlet 22 in the upper part of the separating zone 8 is used to withdraw the reaction product, or products, after contact with the heavier catalyst or treating agent. Spiral type vanes 23 are provided around the inside of the outer shell 1 in this upper zone as an aid in directing the flow of the heavier centrifuged liquid into the annular space between shells 1 and 6, which leads to the mixing zone 7. A small continuous baffle 24 is shown in the lower portion of the mixing zone, to prevent the effect of the rotor 13 from disturbing the downward flow of the heavy liquid from above. This baffle 24, as well as the baffle 6 and the set of straightening vanes 14, may be supported from the housing by suitable fins or struts, which are not illustrated.

The nozzle 25 on the side of the outer shell 1 may be used to withdraw a portion of the heavy liquid phase from the annular space between shells 1 and 6.

Figure 2:
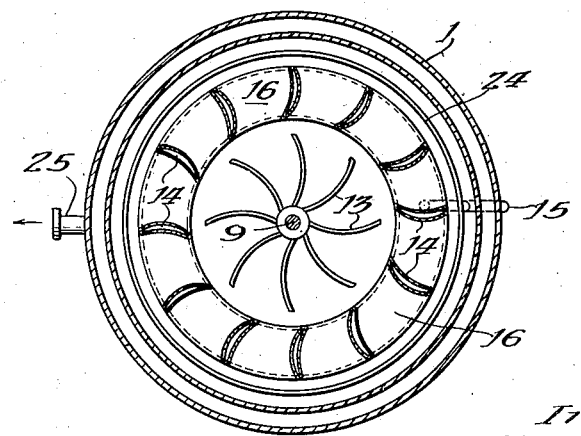
Figure 2 is a sectional plan of the lower portion of the apparatus as indicated by the line 2—2 shown on Figure 1.

In the Figure 2, a sectional plan view of the apparatus is shown as indicated by the section line 2—2. The various parts shown in plan are numbered to correspond to the numbers attached in Figure 1.

It will be noted that in the specific form of the apparatus illustrated that by the removal of the bolts 5, that the cover and the shaft assembly including the rotors can be removed from the chamber or housing 1. The baffle plate 6' can be detached from above and removed with the shaft and rotors. The rotor 13 and the blades 19 are preferably joined to the shaft 9 by keys, set screws or other means, not illustrated, which permit their easy removal from the shaft. All portions of the apparatus are thus made readily accessible for inspection, replacement and repair.

To illustrate the operation of the apparatus of this invention, it will be assumed that it is to be used in connection with the alkylation of hydrocarbons, using hydrogen fluoride as a catalytic contact agent.

A mixture of isoparaffins and olefins, principally isobutane and butylene, are charged continuously to the apparatus through inlet 20, while the hydrogen fluoride catalyst is introduced through inlet 21. The products are well mixed and emulsified in the lower zone 7, aided by the revolving turbine-like rotor 13 and the vanes 14. The reaction, which produces almost entirely paraffin hydrocarbons with isooctanes predominating, takes place at ordinary cooling water temperature. Thus, when using hydrogen fluoride, cooling water can be circulated through the vanes 14, entering through inlet 15 and exiting through outlet 18. However, for other processes, such as the alkylation process using sulfuric acid as a catalyst a lower reaction temperature is desirable and a refrigerant may be circulated through the vanes 14 in order that they act as cooling fins in the reaction zone.

The emulsion or mixture of hydrocarbons and catalyst passes to the upper zone through the central opening in the baffle 6'. The large revolving paddles 19 serve to centrifuge the fluids and throw the heavier hydrogen fluoride to the outside wall 1 and then direct it by vanes 23 down into the annular space between shells 1 and 6. The hydrogen fluoride has a much higher specific gravity than the hydrocarbon product, it is also relatively immiscible with the reactants or reaction product, so that there is considerable natural tendency to get gravity separation taking place in this upper zone. The alkylation products or hydrocarbons are withdrawn from the upper outlet 22 and may be carried on for further processing. The separated hydrogen fluoride flowing down through the annular space around the mixing zone 7 can re-enter the mixing zone from the sides of the lower head 2. Thus, the hydrogen fluoride may be continually reused as a catalyst in contacting the incoming hydrocarbon reactants entering the chamber through inlet 20. After initial start up and the establishment of proper hydrocarbon to catalyst ratio, then the hydrogen fluoride acid feed introduced through inlet 21 need only be enough to make up for the relatively small amount of catalyst which may be dissolved or entrained in the product stream being withdrawn, and which may be withdrawn through nozzle 25 for regeneration.

It is advisable in the alkylation process to have some provision for regenerating the acid catalyst which tends to accumulate hydrocarbon tars and water. A constant withdrawal of a portion of the acid may be made through the nozzle 25 and then be sent on to proper regenerating equipment.

It is not intended to limit the use of this combined mixing and separating apparatus to the alkylation of hydrocarbons, since there are undoubtedly many other chemical or treating processes which may well make use of this invention.

It is also not intended to limit the construction to the particular details shown or mentioned in the above description. For instance, a propeller type of blade may be preferable in some mixing operations to the lower rotor and straightening vanes which are indicated in the mixing section. In the upper centrifuging zone, a different type of rotating blade or device may be used in place of the paddle type of blades 19 which are illustrated. Thus, it can be noted that various modifications of mechanical and structural details may be made and still come within the scope of this invention.

I claim as my invention:

1. A mixing and centrifuging apparatus comprising a cylindrical chamber, a circular baffle disposed horizontally within said chamber and dividing the chamber into a lower section and an upper section, said baffle terminating short of the inner wall of the chamber and having a central opening, a cylindrical shell depending from said baffle adjacent the outer periphery of the latter into said lower section and terminating above the bottom of the lower section, a rotatable drive shaft extending vertically through the chamber and through the central opening of said baffle, the drive shaft being of smaller cross-sectional area than said opening, a mixing rotor secured to the shaft in said lower section, and a centrifuging blade secured to the shaft in said upper section.

2. A mixing and centrifuging apparatus comprising a cylindrical chamber, a circular baffle disposed horizontally within said chamber and dividing the chamber into a lower section and an upper section, said baffle terminating short of the inner wall of the chamber and having a central opening, a cylindrical shell depending from said baffle adjacent the outer periphery of the latter into said lower section and terminating above the bottom of the lower section, a rotatable drive shaft extending vertically through the chamber and through the central opening of said baffle, the drive shaft being of smaller cross-sectional area than said opening, a mixing rotor secured to the shaft in said lower section, a plurality of vanes disposed vertically within the lower section between said rotor and said shell, and a centrifuging blade secured to the shaft in said upper section.

3. A mixing and centrifuging apparatus comprising a cylindrical chamber, a circular baffle disposed horizontally within said chamber and dividing the chamber into a lower section and an upper section, said baffle terminating short of the inner wall of the chamber and having a central opening, a cylindrical shell depending from said baffle adjacent the outer periphery of the latter into said lower section and terminating above the bottom of the lower section, a rotatable drive shaft extending vertically through the chamber and through the central opening of said baffle, the drive shaft being of smaller cross-sectional area than said opening, a mixing rotor secured to the shaft in said lower section, a centrifuging blade secured to the shaft in said upper section, and baffling means constructed and arranged within said upper section to direct liquid from the upper section into the annular space between said shell and the chamber wall.

4. The apparatus as defined in claim 3 further characterized in that said baffling means comprises spirally arranged vanes secured to the chamber wall within said upper section.

5. A mixing and centrifuging apparatus comprising a cylindrical chamber, a circular baffle disposed horizontally within said chamber and dividing the chamber into a lower section and an upper section, said baffle terminating short of the inner wall of the chamber and having a central opening, a cylindrical shell depending from said baffle adjacent the outer periphery of the latter into said lower section and terminating above the bottom of the lower section, a rotatable drive shaft extending vertically through the chamber and through the central opening of said baffle, the drive shaft being of smaller cross-sectional area than said opening, a plurality of curved blades secured to the shaft in said lower section, a centrifuging paddle secured to the shaft in said upper section, a plurality of vanes disposed vertically within the lower section between said blades and said shell, and directing vanes arranged spirally along the chamber wall in the upper section.

6. The apparatus as defined in claim 2 further characterized in that said vanes are of hollow construction and are provided with conduits for circulating a heat exchange fluid therethrough.

ELMER R. KANHOFER.

REFERENCES CITED

The following references are of record in the file of this patent:

UNITED STATES PATENTS

| Number | Name | Date |
|--------|------|------|
| 497,416 | Sharples | May 16, 1893 |
| 542,756 | Ekenberg | July 16, 1895 |
| 675,891 | Haywood | June 11, 1901 |
| 716,703 | Gathmann | Dec. 23, 1902 |
| 2,031,939 | Donlan | Feb. 25, 1936 |
| 2,386,681 | Hadden | Oct. 9, 1945 |